Jan. 7, 1964   E. T. VOGEL ETAL   3,116,833
HORIZONTAL EXTRUSION PRESS
Filed July 31, 1961   4 Sheets-Sheet 3

INVENTORS
ERIC T. VOGEL
OTTO HAMMON
BY
AGENT.

Jan. 7, 1964
E. T. VOGEL ETAL
3,116,833
HORIZONTAL EXTRUSION PRESS
Filed July 31, 1961
4 Sheets-Sheet 4
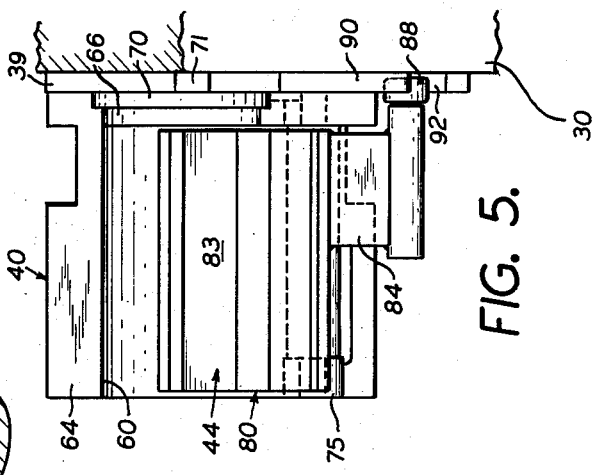
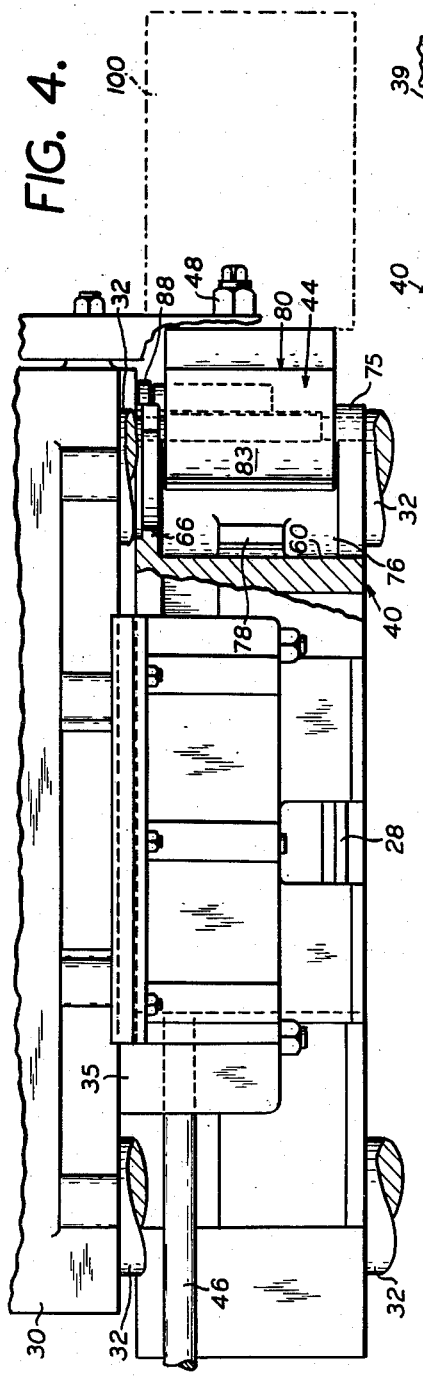
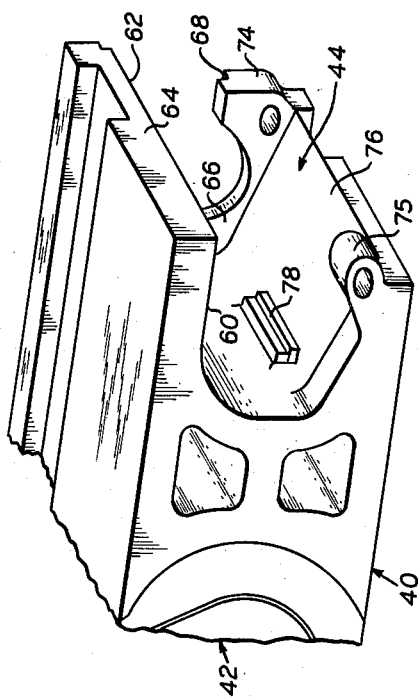
INVENTORS
ERIC T. VOGEL
OTTO HAMMON
BY
AGENT.

United States Patent Office 3,116,833
Patented Jan. 7, 1964

3,116,833
HORIZONTAL EXTRUSION PRESS
Eric T. Vogel, Elmhurst, N.Y., and Otto Hammon, Scotch Plains, N.J., assignors to Baldwin-Lima-Hamilton Corporation, a corporation of Pennsylvania
Filed July 31, 1961, Ser. No. 127,974
7 Claims. (Cl. 207—1)

This invention relates to horizontal presses for extruding material in the plastic state through a perforated die, and more particularly to horizontal extrusion presses having means for removing residual material therefrom.

The residue or discard present after an extrusion operation is usually in the form of a butt end and may also include a shell or sleeve-like portion. One or more tools normally adhere to the residual material. The terms residue, residual material, and discard as used hereinafter refer to work material left over after extrusion as well as to any tools adhering thereto.

Various devices have been proposed for removing residual material from extrusion presses. In machines having a transversely movable die slide, the latter has been provided with an inclined, auxiliary slot which is open at the bottom, and into which the residue is pushed so that it drops down through the bottom opening to an area below the working level. In machines having a rotary die support, the latter has been equipped with a cup-shaped portion to receive the residue. When the die support is rotated so that the cup opening points downwardly, the contents of the cup will drop down therefrom.

To separate the work material from tools adhering thereto, the residue is usually placed on a work table. After dropping down to a relatively low level, the residue must be lifted to deposit it on the table. Consequently the prior arrangements make it necessary to provide a discard elevator or similar equipment. This does not only cause additional expenses but also results in delays in the processing of the discard.

Referring again to the aforementioned slot in the transverse die slide, a disk has sometimes been inserted therein so that shell portions of the residue may be crushed against the disk to reduce the length thereof. With the conventional slot being open at its bottom, it is necessary to fasten the crushing disk to the slide. This is cumbersome since the disk must be dismounted when required, e.g., for removing a cold charge or so-called "sticker" from the machine.

It is an object of the invention to provide simple means for removing residual material from a horizontal extrusion press at a predetermined level.

It is also an object of the invention to expedite the removal of residual material from a horizontal extrusion press.

It is a further object of the invention to provide automatic means for ejecting residual material from a die slide movable transversely of a horizontal extrusion press.

It is an additional object of the invention to arrange a crushing disk in the die slide of an extrusion press in a manner such that the disk may readily be inserted in and removed from the slide.

Various other objects, features and advantages of the invention will become apparent as the description proceeds.

In the drawings which illustrate an embodiment of the invention by way of example, FIG. 1 is a cross sectional view of an extrusion press according to the invention, generally taken along line 1—1 of FIG. 3 but shown on a larger scale;

FIG. 4 is a diagrammatic plan view of a portion of the press shown in FIG. 1, partly in section;

FIG. 5 is an enlarged, fragmentary view taken generally as indicated by line 5—5 of FIG. 1;

FIG. 6 is a perspective view of a detail.

Figure 1:
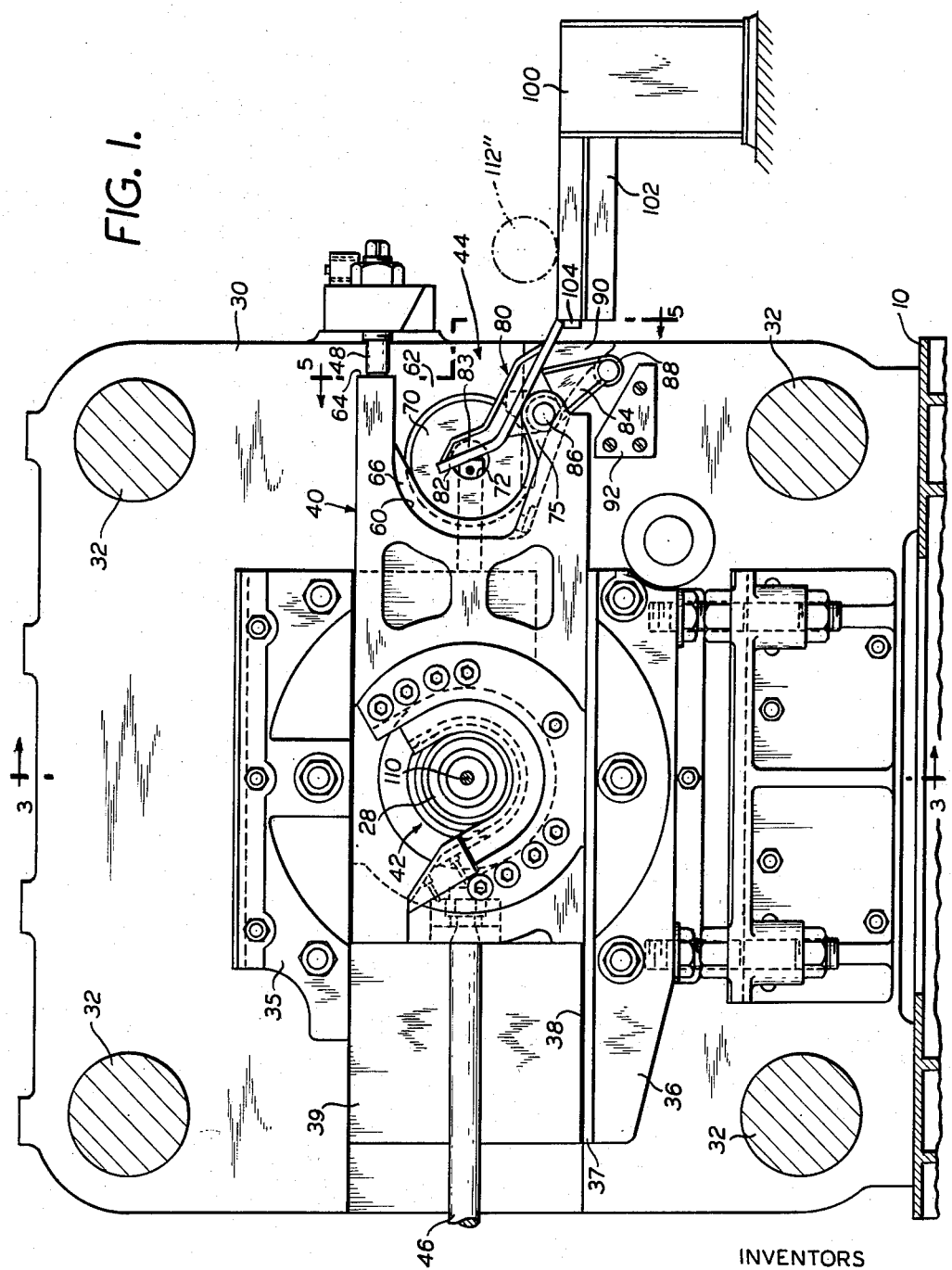

Referring to the drawings, the extrusion press illustrated therein operates along a horizontal axis X—X (FIG. 3) and has a base or frame 10, a housing 12 slidable on the frame, and a lined container 14 mounted in the housing 12. Bore 16 of the lined container accommodates a reciprocable plunger or stem 20 and a tool in the form of a dummy block 22 for cooperation with a perforated die assembly 28 during extrusion.

To take up extrusion forces, a platen 30 is arranged on base 10 at one end of the press and connected by tie rods 32 to the other end (not shown). The platen has a stepped passage 33 therethrough, the axis of which coincides with the horizontal axis X—X of the press. Fastened to the platen 30 are an upper holder 35 and a lower holder 36 having a wear plate 37 thereon to form a guideway 38. A lateral wear plate 39 (FIG. 1) is mounted on the platen intermediate the holders 35 and 36. The guideway 38 extends transversely of the press and accommodates a tool-supporting member or die slide generally indicated at 40 which adjacent one of its ends is provided with a die station 42, the die assembly 28 being mounted at this station. Adjacent its other end, the slide 40 is provided with a discharge station 44. Actuating means such as a piston rod 46 serve to shift the die slide so that alternately the die station 42 and the discharge station 44 will be aligned with the axis X—X of the press. An adjustable abutment 48 limits movement of the die slide to the right in FIG. 1, movement in the opposite direction being limited by the actuating means.

Figure 2:
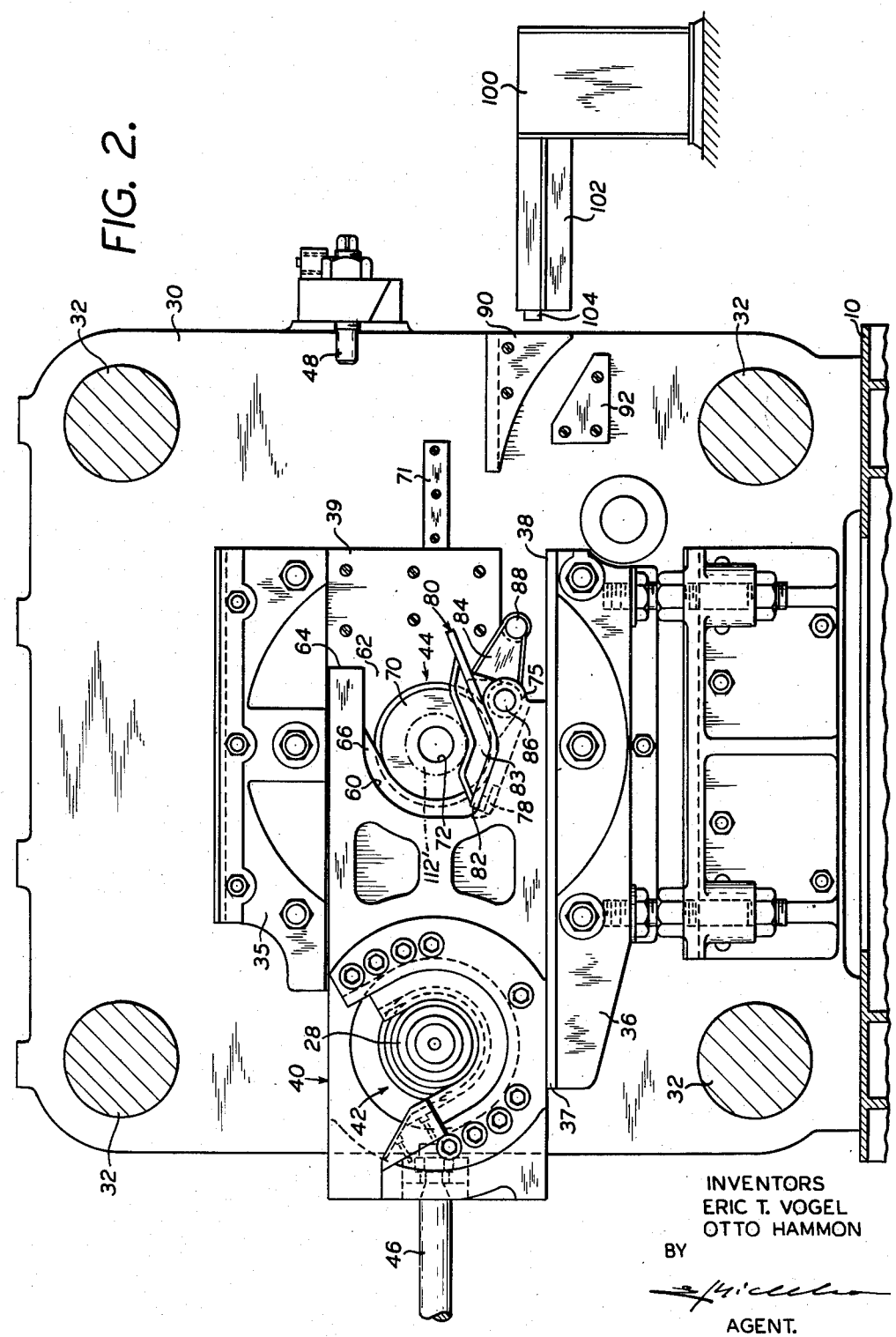
FIG. 2 is a view similar to FIG. 1 but illustrating the parts in a different position.

Disposed at the discharge station 44 is a generally U-shaped recess 60 which terminates in an opening 62 in the adjacent end face 64 of the slide and extends inwardly therefrom, see in particular FIG. 6 which illustrates the discharge end of the slide in disassembled condition. The recess 60 reaches in the axial direction of the press entirely through the slide 40 from the side thereof facing the platen to the opposite side facing the container 14. A lateral wall or flange 66 at the side of the recess adjacent the platen 30 serves to form a downwardly inclined, substantially U-shaped seat 68. The latter is closed at its bottom to receive a disk 70 (FIG. 2) which, when the slide 40 is shifted, moves along the wear plate 39 and along an extension plate 71 mounted on the platen. The disk 70 has an opening 72 therein to facilitate the handling thereof. A pair of lateral, perforated lugs 74, 75 (FIG. 6) border the recess. Lug 74 is positioned at the side of the slide facing the platen and as shown may be joined to flange 66, the other lug 75 being positioned at the opposite side. The lowest wall or bottom 76 of the recess has an abutment 78 thereon.

A discard carrier generally indicated at 80 (FIG. 2) comprises a tray-like or trough-shaped top 82 extending into the recess 60 and provided with a bolster 83. An arm 84 is rigidly attached to the top 82 and pivotally mounted or journaled in the perforated lugs 74, 75 at 86 in a manner such that the discard carrier is disposed between the lugs and rockable about an axis parallel to the horizontal axis X—X of the press. The lower end of arm 84 is provided with a follower or roller 88 arranged to cooperate with cam means which as shown may comprise a pair of upper and lower cams 90, 92 fastened to the platen 30.

To receive discard material from carrier 80, a table 100 is arranged laterally of the press and provided with an extension 102 having a projection 104 at its end.

Operation

Figure 3:
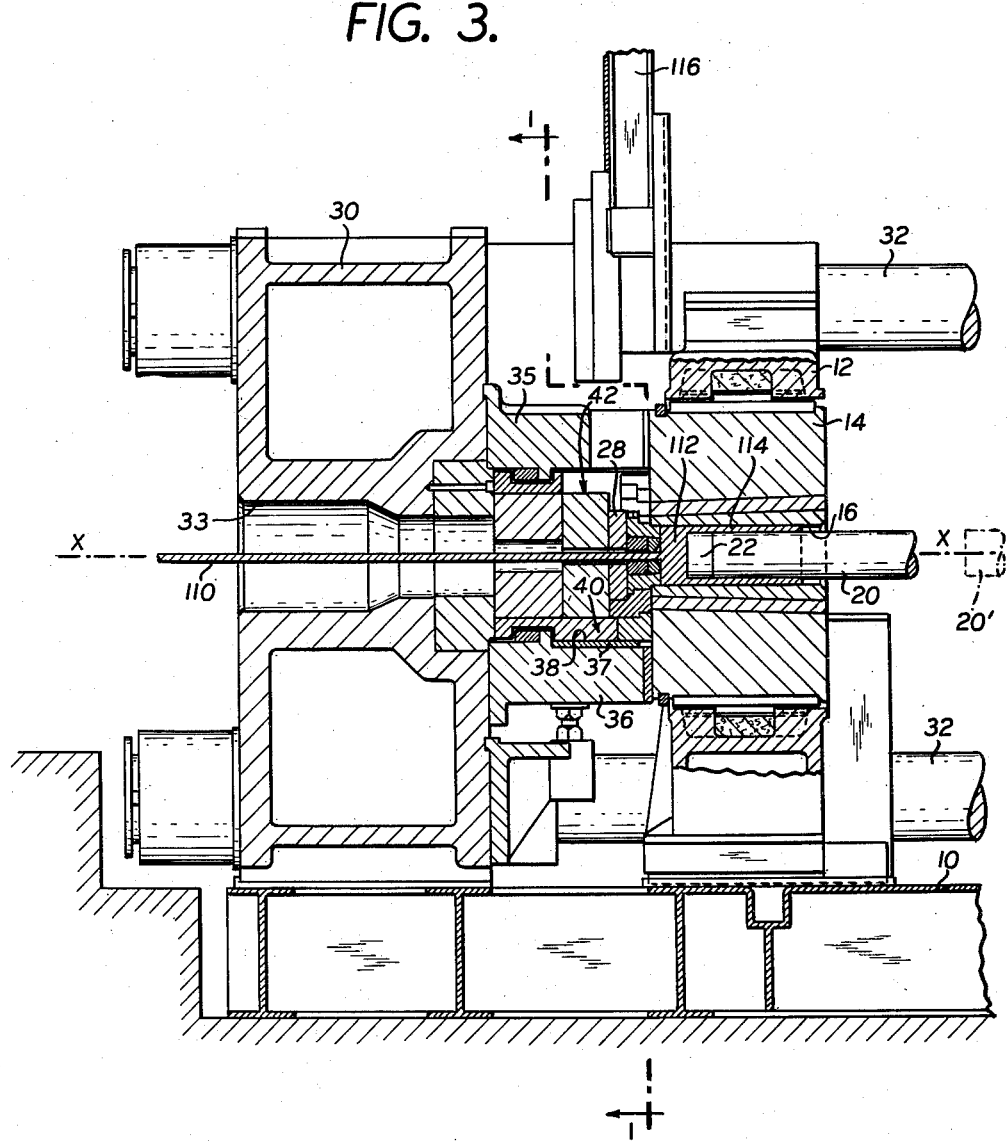
FIG. 3 is a fragmentary longitudinal section taken along line 3—3 of FIG. 1 and shown on a reduced scale.

At the start of the operation, die slide 40 is in its extruding position as shown in FIG. 1, i.e., the die station 42 registers with the horizontal axis X—X of the press. Stem 20 is in a withdrawn position as indicated in phantom at 20' in FIG. 3 so that work material to be shaped and the dummy block 22 may be loaded in the container 14. The stem is then advanced to bear upon the dummy block 22 and the work material so that the latter will be extruded through the perforated die assembly 28. In FIG. 3 the parts are illustrated in full lines in the position at the end of the extrusion, the extruded part being indicated at 110. The residue or discard which is left back comprises a butt end shown at 112 and may also include a shell or sleeve-like portion 114 which is usually removed from the container with the aid of a tool such as a cleaning disk similar to the dummy block but fitting the container bore more closely. Upon completion of the extrusion, container 14 and stem 20 are withdrawn a short distance to the right in FIG. 3, taking the residual portions 112, 114 along and pulling the extruded part 110 back somewhat through the die assembly 28. Thereafter, the residue is severed from the extruded part 110 by means of a cutting device 116 such as a saw or shear, the extruded part 110 being removed from the die assembly 28 through the passage 33 of platen 30.

Piston rod 46 is now actuated to shift the die slide 40 from its extruding position (FIG. 1) to an auxiliary position (FIG. 2) so as to move the die station 42 to an easily accessible area and bring the discharge station 44 into registry with the axis X—X of the press. Follower 88 will be guided by the lower cam 92 during the shifting motion and this will cause carrier 80 to turn relative to slide 40 with the trough-shaped top 82 descending within and through opening 62 towards the bottom wall 76 of recess 60 until the top 82 overlies the bottom 76. Stem 20 is then advanced, preferably together with the container to bring the latter into engagement with the platen and die slide assembly. The advance of the stem is continued through the distance required to push the residue out of the container and discharge it onto the top of carrier 80 as indicated in phantom at 112' in FIG. 2. The shell 114 which is desirable in the case of material such as heated billets of copper or copper alloys may be crushed within the recess 60 by means of the advancing stem 20 to reduce the length of the shell. This is done, in the auxiliary position of the slide, with the aid of the disk 70 inserted in seat 68 to cover passage 33 of the platen. If the actual residual work material and tools (e.g., the dummy block 22 and any cleaning disk used) adhere to each other, they are pushed together onto the discard carrier 80 which may tend to move downward under the action of gravity but will be supported by the abutment 78 at the bottom of recess 60.

Thereafter, the container 14 and stem 20 are withdrawn and piston rod 46 is actuated again to return die slide 40 from its auxiliary position to the extruding position shown in FIG. 1, the movement being limited by the adjustable abutment 48 contacting the slide. Follower 88 will be guided by the upper cam 90 during the movement and this will cause the top 82 of carrier 80 to ascend away from bottom wall 76 and to swing outwardly until the projection 104 is engaged. Thereby the residue, including the butt end 112, shell 114 and any tools adhering thereto, will be ejected from the die slide 40. As indicated in phantom at 112" in FIG. 1, the residue will be deposited on the table extension 102. An operator will move the discard to the adjoining table 100 to separate the actual residual work material from any tools and to prepare such tools for use in a subsequent operation.

It will be clear from the foregoing description that the invention provides simple and effective means for ejecting residual material at the level of the work table 100 so that it may be processed upon discharge from the press without being lifted by an elevator or the like. It will also be evident that the residue is conveyed to the work table immediately upon movement of the slide to its extruding position, and that the ejection from the slide is performed automatically. Further, it will be apparent that the crushing disk 70 may readily be inserted in, or removed from, its seat 68. As this seat is closed at its bottom, it is not necessary to fasten the disk to the slide. Rapid removal of the disk is of great importance in case chilled or insufficiently heated material must be eliminated from the container by pushing such material in the auxiliary position of slide 40 through the recess 60 into passage 33 of the platen.

While certain preferred embodiments of the invention have been described, it will be understood that various modifications and changes may be made without departing from the scope and spirit of the invention as defined in the appended claims.

Having now described our invention, what we claim is:

1. In an extrusion press operating along a generally horizontal axis, a platen, a tool-supporting member provided with a die station and a discharge station and mounted on said platen for movement transversely of the press, said member having a recess therein at its discharge station, actuating means for shifting said member to bring its die station and discharge station alternately into registry with said horizontal axis, a discard carrier movable relative to said tool-supporting member and arranged to extend into said recess for receiving residual material resulting from an extrusion operation, and means for moving said carrier relative to said tool-supporting member to eject said residual material from the press at a predetermined level and in a direction generally transversely of said horizontal axis.

2. In an extrusion press operating along a generally horizontal axis, a platen, a slide provided with a die station and a discharge station and mounted on said platen for movement transversely of the press, said slide having a recess therein at its discharge station, actuating means for shifting said slide transversely of the press between an extruding position and an auxiliary position to bring said die station and discharge station alternately into registry with said horizontal axis, a discard carrier movably mounted on the slide and extending into said recess for receiving extrusion residue in said auxiliary position of the slide, and means for automatically moving the discard carrier relative to the slide and thereby ejecting said residue from the press at a predetermined level when said slide is shifted to its extruding position.

3. In an extrusion press operating along a generally horizontal axis, a platen, a slide mounted on said platen for movement transversely of the press and having a die station adjacent one of its ends and a discharge station adjacent its other end, said slide being provided at its discharge station with a generally U-shaped recess having a terminal opening in said other end of the slide and extending therefrom inwardly, actuating means for shifting said slide transversely of the press between an extruding position and an auxiliary position to bring said die station and discharge station alternately into registry with said horizontal axis, a discard carrier including a trough-shaped top and an arm attached to said top and pivotally mounted on the slide, said trough-shaped top extending into said recess for receiving extrusion residue in said auxiliary position of the slide, and means for moving the discard carrier relative to the slide for ejecting said residue from the press at a predetermined level when said slide is shifted to its extruding position.

4. Extrusion apparatus as specified in claim 3, in which said trough-shaped top of the discard carrier is arranged to overlie the lowest wall of said recess in the auxiliary position of the slide, and in which cam means and follower means are provided for lifting said top away from said lowest wall upon movement of the slide to its extruding position and for lowering said top again towards said lowest wall upon movement of the slide to its auxiliary position, one of said cam means and follower means being mounted on said platen and the other one of said cam means and follower means being mounted on said arm of the discard carrier.

5. Extrusion apparatus as specified in claim 3, in which the pivotally mounted discard carrier is rockable about an axis parallel to the horizontal axis of the press and said trough-shaped top of the carrier is movable towards and away from the bottom of the recess through said terminal opening of said recess, and in which an abutment is provided at said bottom of the recess to limit rocking movement of said carrier in one direction, and table means are positioned laterally of and close to the press to receive said extrusion residue from the discard carrier and limit rocking movement of said carrier in the opposite direction.

6. Extrusion apparatus as specified in claim 3, in which the recess extending inwardly from one end of the slide reaches in the axial direction of the press through the slide from the side thereof facing the platen to the opposite side, and in which a pair of lateral lugs bordering said recess are provided on the slide, one of said lugs being positioned at the side of the slide facing the platen and the other lug being positioned at the opposite side, said discard carrier being arranged between said lugs and journaled therein.

7. In an extrusion press operating along a generally horizontal axis, a platen having a bore therethrough with the axis thereof coinciding with said axis of the press, a slide having a die station adjacent one of its ends and a discharge station adjacent its other end and mounted on said platen for movement transversely of the press, said slide being provided at its discharge station with a generally U-shaped recess having a terminal opening in said other end of the slide and extending therefrom inwardly, said recess reaching in the axial direction of the press through the slide from the side thereof facing the platen to the opposite side, a downwardly inclined, substantially U-shaped seat provided in the wall of said recess adjacent the platen and closed at its bottom, actuating means for shifting said slide transversely of the press between an extruding position and an auxiliary position to bring said die and discharge stations alternately into registry with said bore of the platen, a discard carrier movably mounted on the slide and extending into said recess for receiving extrusion residue in said auxiliary position of the slide, a disk insertable in said seat to cover said bore in the platen in the auxiliary position of the slide for crushing said residue at least partly against said disk, and means for moving the discard carrier relative to the slide for ejecting said crushed residue from the press at a predetermined level when said slide is shifted to its extruding position.

References Cited in the file of this patent
UNITED STATES PATENTS

| | | |
|---|---|---|
| 2,858,017 | Kent et al. | Oct. 28, 1958 |
| 2,954,869 | Swanson | Oct. 4, 1960 |